United States Patent
Barber et al.

(10) Patent No.: US 9,940,356 B2
(45) Date of Patent: Apr. 10, 2018

(54) EFFICIENT JOIN-FILTERS FOR PARALLEL PROCESSING

(71) Applicant: International Business Machines Corporation, Armonk, NY (US)

(72) Inventors: Ronald J. Barber, San Jose, CA (US); Naresh K. Chainani, Portland, OR (US); Kiran K. Chinta, Hillsboro, OR (US); Ian R. Finlay, Uxbridge (CA); Vijayshankar Raman, Sunnyvale, CA (US); Liping Zhang, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 14/447,878

(22) Filed: Jul. 31, 2014

(65) Prior Publication Data
US 2016/0034531 A1    Feb. 4, 2016

(51) Int. Cl.
*G06F 17/30* (2006.01)
*H04L 29/08* (2006.01)
*H04L 12/851* (2013.01)

(52) U.S. Cl.
CPC .. *G06F 17/30445* (2013.01); *G06F 17/30463* (2013.01); *G06F 17/30466* (2013.01);
(Continued)

(58) Field of Classification Search
None
See application file for complete search history.

(56) References Cited

U.S. PATENT DOCUMENTS 5,867,799 A    2/1999  Lang et al.
7,930,547 B2 *  4/2011  Hao .................. H04L 45/745
                                            713/176
(Continued)

OTHER PUBLICATIONS

Adina Crainiceanu. 2013. Bloofi: a hierarchical Bloom filter index with applications to distributed data provenance. In Proceedings of the 2nd International Workshop on Cloud Intelligence (Cloud-I '13). ACM, New York, NY, USA, Article 4, 8 pages. DOI=http://dx.doi.org/10.1145/2501928.2501931, retrieved May 30, 2017.*

(Continued)

*Primary Examiner* — Mariela Reyes
*Assistant Examiner* — Edward Jacobs
(74) *Attorney, Agent, or Firm* — Erik K. Johnson; SVL IPLaw Edell, Shapiro & Finnan, LLC

(57) ABSTRACT

According to one embodiment of the present invention, a method of transferring filters for operations in a distributed system comprises generating at each source node a first filter of a first size. The first filter indicates elements of objects that need not be processed for an operation. Each source node generates one more second filters of a second size less than the first size. Each generated second filter is based on a prior generated filter with each location representing a plurality of locations from the prior generated filter. A second filter is transferred from each source node to each of destination node. The elements of the objects to remove for the operation are determined based on the transferred second filters. Embodiments of the present invention further include a system and computer program product for transferring filters in a distributed system in substantially the same manners described above.

18 Claims, 6 Drawing Sheets

(52) U.S. Cl.
CPC .. *G06F 17/30864* (2013.01); *G06F 17/30867* (2013.01); *H04L 67/1097* (2013.01); *H04L 47/24* (2013.01)

(56) References Cited

U.S. PATENT DOCUMENTS

| | | | |
|---|---|---|---|
| 8,032,732 B2 | 10/2011 | Beyer et al. | |
| 8,145,642 B2* | 3/2012 | Cruanes | G06F 17/30498 707/745 |
| 8,209,368 B2 | 6/2012 | Beyer et al. | |
| 8,370,315 B1* | 2/2013 | Efstathopoulos | G06F 17/3015 707/696 |
| 8,484,438 B2* | 7/2013 | Cypher | G06F 12/0811 711/147 |
| 8,548,987 B2 | 10/2013 | Rauser et al. | |
| 8,560,558 B2* | 10/2013 | Watanabe | G06F 17/3033 707/756 |
| 9,298,632 B2* | 3/2016 | Chappell | G06F 12/0842 |
| 2001/0020245 A1 | 9/2001 | Golds | |
| 2005/0086520 A1* | 4/2005 | Dharmapurikar | H04L 63/145 726/4 |
| 2005/0223102 A1* | 10/2005 | Zhang | H04L 45/00 709/228 |
| 2006/0117036 A1* | 6/2006 | Cruanes | G06F 17/30498 |
| 2008/0243800 A1* | 10/2008 | Beyer | G06F 12/0864 |
| 2008/0243941 A1* | 10/2008 | Beyer | G06F 17/10 |
| 2009/0031082 A1* | 1/2009 | Ford | G06F 12/0864 711/128 |
| 2009/0307193 A1 | 12/2009 | Ganjikunta | |
| 2010/0082648 A1* | 4/2010 | Potapov | G06F 3/0611 707/756 |
| 2010/0284405 A1* | 11/2010 | Lim | H04L 45/00 370/392 |
| 2010/0332765 A1* | 12/2010 | Cypher | G06F 12/0811 711/141 |
| 2011/0087779 A1* | 4/2011 | Martin | H04L 43/00 709/224 |
| 2011/0131198 A1* | 6/2011 | Johnson | G06F 17/30498 707/714 |
| 2011/0225182 A1* | 9/2011 | Tsuchiya | G06F 17/3033 707/769 |
| 2011/0225191 A1* | 9/2011 | Xie | G06F 17/30312 707/775 |
| 2012/0072656 A1* | 3/2012 | Archak | G06F 17/30132 711/104 |
| 2012/0310960 A1* | 12/2012 | Watanabe | G06F 17/30946 707/756 |
| 2013/0036277 A1* | 2/2013 | Szczepkowski | G06F 3/0608 711/159 |
| 2013/0166576 A1* | 6/2013 | Hudzia | G06F 17/3033 707/754 |
| 2013/0173536 A1* | 7/2013 | Gokhale | G06F 17/30286 707/610 |
| 2013/0173853 A1* | 7/2013 | Ungureanu | G06F 12/124 711/103 |
| 2013/0297613 A1* | 11/2013 | Yu | G06F 17/30327 707/741 |
| 2014/0025684 A1* | 1/2014 | Hess | G06F 17/30699 707/741 |
| 2014/0067830 A1* | 3/2014 | Buhler | G06F 19/22 707/749 |
| 2014/0143271 A1 | 5/2014 | Klotzer | |
| 2014/0143498 A1* | 5/2014 | Olson | G06F 12/0802 711/132 |
| 2014/0351518 A1 | 11/2014 | Chang | |
| 2015/0220570 A1 | 8/2015 | Attaluri et al. | |
| 2015/0220573 A1* | 8/2015 | Attaluri | H04L 67/42 707/690 |
| 2016/0034587 A1 | 2/2016 | Barber et al. | |

OTHER PUBLICATIONS

Wang et al.; "CasAB: Building Precise Bitmap Indices Via Cascaded Bloom Filters", IEEE/ICICSE 4th International Conference on, Dec. 21-22, 2009, pp. 85-92.

Kim et al.; "Sort Vs. Hash Revisited: Fast Join Implementation on Modern Multi-Core CPUs", ACM/Proceedings of the VLDB Endowment, vol. 2, Iss. 2, Aug. 2009, pp. 1378-1389.

Michael Mitzenmacher; "Bloom Filters: A History and Modern Applications", www.eecs.harvard.edu/~michaelm/TALKS/NewZealandBF.ppt, accessed Feb. 2014, 45 pages.

CompArch; "Bloom Filters", http://semipublic.comp-arch.net/wiki/Bloom_Filters, accessed Jun. 2013, 4 pages.

Georgia Koloniari and Evaggelia Pitoura; "Bloom-Based Filters for Hierarchical Data", http://www.google.com/url?sa=t&rct=j&q=&esrc=s&source=web&cd=1&cad=rja&ved=0CC8QFjAA&url=http%3A%2F%2Fciteseerx.ist.psu.edu%2Fviewdoc%2Fdownload%3Fdoi%3D10.1.1.64.1694%26rep%3Drep1%26type%3Dpdf&ei=bodDUZqnKPHZyQH6rYHgDQ&usg=AFQjCNFs2Ef2wshTkzTRoUQIk4YgB3mwcw&bvm=bv.43828540,d.aWc, 12 pages.

Papapetrou, O. et al.; "Cardinality estimation and dynamic length adaptation for Bloom filters"; Distributed and Parallel Databases, vol. 28, No. 2-3, pp. 119-156; Dec. 2010.

Chitrapura, KP. et al.; "Method and System for Response Prediction using Collaborative Filtering with Hierarchies and Side-Information"; An IP.com Prior Art Database Technical Disclosure; http://ip.com/IPCOM/000213589D; Dec. 22, 2011.

SPI DST et al.; "Resource-Efficient Parallel Algorithms"; An IP.com Prior Art Database Technical Disclosure; http://ip.com/IPCOM/000150512D; Apr. 18, 2007.

List of IBM Patents or Patent Applications Treated as Related, Mar. 13, 2015.

List of IBM Patents or Patent Applications Treated as Related, Mar. 27, 2015.

* cited by examiner

EFFICIENT JOIN-FILTERS FOR PARALLEL PROCESSING

BACKGROUND

Present invention embodiments relate to database systems, and more specifically, to using multilevel join-filters to identify non-matching rows of database tables for join or other operations in a parallel processing system.

In large database systems, data is commonly distributed across several nodes in a shared-nothing manner. Some database operations may require data to be exchanged between nodes. For example, in a join operation, nodes having local outer-table records (outer-nodes) may send those records to nodes having local inner-table records (inner-nodes). The inner-nodes join the received outer-table records with matching local records of the inner-table.

One technique to reduce network traffic is for each inner-node to send a Bloom filter to the outer-nodes. The Bloom filter is typically a bitmap of hash values of the join keys on the inner-node. The outer-nodes use the received bitmaps to filter out local outer-table records that will not have matches before sending those records over the network.

However, collisions may result in an outer-node sending records that will not have matches on an inner-node. The larger the inner table, the larger the Bloom filters must be to avoid too many collisions. If the inner table is too large, the cost of shipping the Bloom filters over the network and storing them (one from each inner-node) on each outer-node may become prohibitive. Conventional database systems forego the use of Bloom filters where the network or memory overhead is too high.

SUMMARY

According to one embodiment of the present invention, a method of transferring filters for operations in a distributed system including a plurality of source nodes and destination nodes comprises generating at each source node a first filter of a first size. The first filter indicates elements of objects that are not processed for an operation. Each source node generates one or more second filters, each of a second size less than the first size. A generated second filter is based on a prior generated filter with each location in the generated second filter representing a plurality of locations from the prior generated filter. A second filter from among the one or more second filters having the second size is transferred from each of the source nodes to each of the destination nodes. The elements of the objects to remove for the operation are determined based on the transferred second filters. Embodiments of the present invention further include a system and computer program product for transferring filters in a distributed system in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
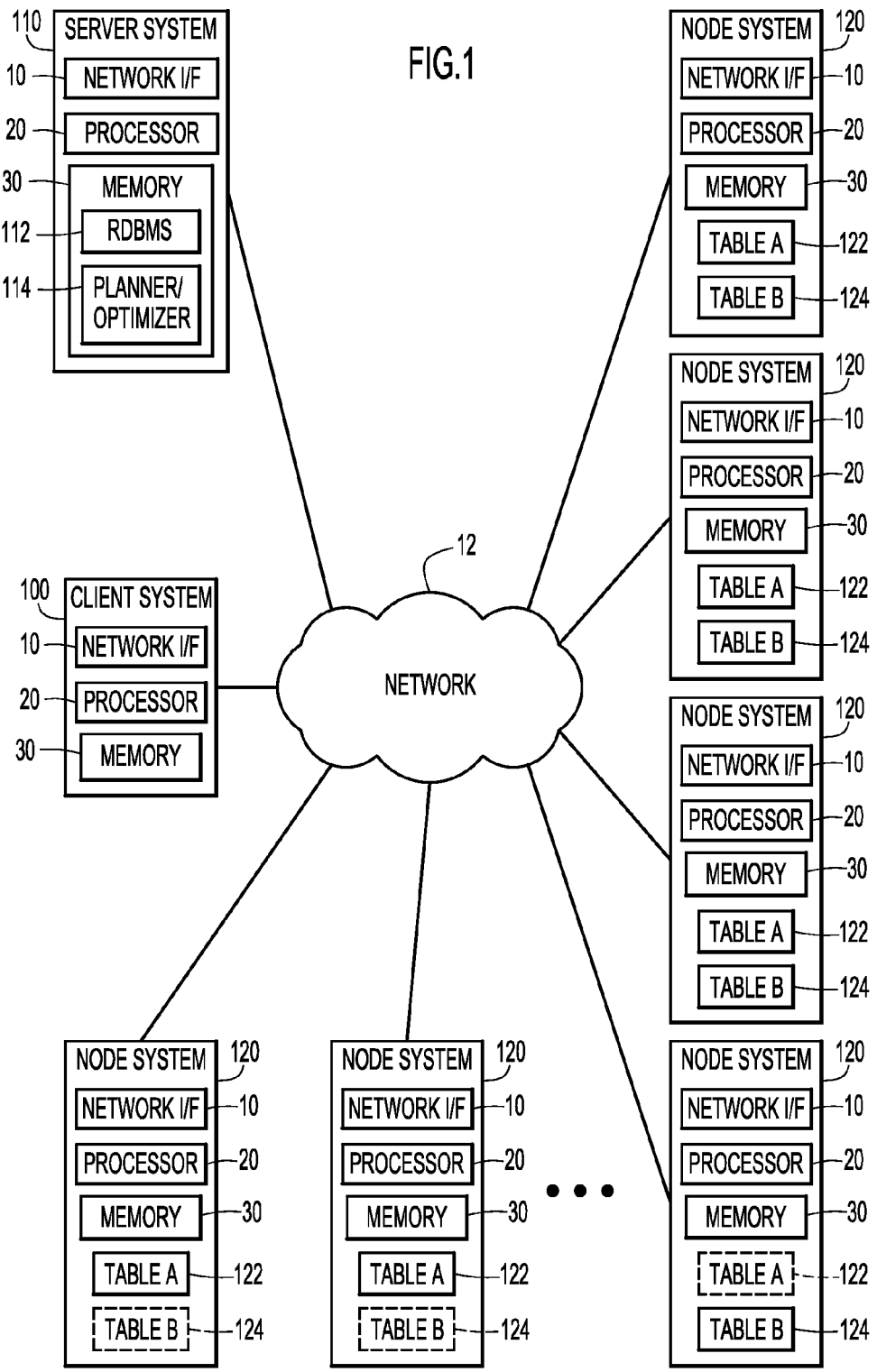
FIG. 1 is a diagrammatic illustration of an example computing environment for an embodiment of the present invention.

Present invention embodiments generate and transfer filters between nodes of a parallel processing system. A filter is a data structure that may be used in testing whether an element is a member of a set. The results of the test indicate either that the element is not in the set or that the element is possibly in the set. In other words, false positive matches are possible, but false negatives are not. Examples of filters include Bloom filters, counting filters, compact approximators, and related objects. In the context of a database join operation, a filter is sometimes referred to as a "join-filter." Conventional join-filters are Bloom filters.

A Bloom filter is implemented as a bitmap or other compact data structure using one or more hash functions. The bitmap is initialized by setting each bit to zero. For each element of the set (e.g., each join key from an inner table of the join operation), a hash function is applied to that element, and the resulting hash value is used as an address of a bit in the bitmap. The bit at that address is set to one to indicate the presence of a corresponding element in the set. To test whether an item (e.g., a join key from an outer table of the join operation) is a member of the set, the hash function may be applied to the item and the corresponding bit at the address represented by the resulting hash value examined. If the value of the bit is zero, the item is not in the set. If the value of the bit is one, the item is possibly in the set: that is, the item may be in the set or there may have been a hash collision.

If more than one hash function is used, the bitmap may be built by applying each hash function to each element of the set, and setting to one each bit in the bitmap corresponding to the resulting hash values. To test whether an item is a member of the set, the hash functions may be applied to the item and the bits corresponding to the resulting hash values examined. If any of the corresponding bits is zero, the item is not in the set. If all of the corresponding bits are one, the item is possibly in the set.

A multilevel filter comprises a plurality of filters, each of which may be sized to fit within a corresponding memory level of a hierarchical or other memory structure. For example, a computer system may have a 32 kilobyte (KB) level one (L1) cache, 256 KB L2 cache, 4 megabyte (MB) L3 cache, and one or more gigabytes (GB) of local random access memory (RAM). A filter in the form of a bitmap of size 32 MB fits in local RAM but exceeds the capacity of the L3 cache. Three additional filters may be generated with smaller bitmaps corresponding to the three cache levels. For example, each bit in the L3-sized filter may represent 8 consecutive bits of the 32 MB filter; each bit in the L2-sized filter may represent 128 consecutive bits of the L3-sized filter; and each bit in the L1-sized filter may represent 8 consecutive bits of the L2-sized join-filter. The original filter and the three additional filters together make up a multilevel filter. To perform a membership test, the individual filters or levels are probed in order of smallest to largest. If the result from a level is negative—indicating that the element is not a member of the set—higher levels are not probed.

One or more levels may be omitted when the multilevel filter is built, or may be temporarily disabled at runtime when the multilevel filter is probed, if they are ineffective (for instance, a level may have a low rate of negative results because it is densely populated or suffers from too many hash collisions).

A multilevel filter may make the time-cost of probing a join-filter affordable in relational databases deployed in large data warehouse environments or other so-called. Big Data environments where join-filter sizes are typically large. Data of the smaller, more frequently probed filter levels become available in the smaller, faster caches (to an extent that may depend, e.g., on the efficiency of the levels).

One aspect of a present invention embodiment is to reduce the amount of network traffic and the memory footprint of join-filters in a distributed database system using multilevel filters. In an example scenario, two tables for a join operation, A and B, are each distributed across sixteen nodes. The plan chosen by the query optimizer is to send table A data from each node to each of the other nodes over the network. A Bloom filter indicating join keys absent from an individual node with table B may have a size of eight megabytes (MB) for a preferred false positive rate. If each node were to build a Bloom filter of this size and transfer that Bloom filter to each of the other nodes, the resulting network traffic would be (8 MB×($16^2$−16))=1.9 gigabytes (GB). Each node would need 128 MB of memory to store all of the Bloom filters received for the join operation.

According to an embodiment of the present invention, each node may build a multilevel filter comprising, for example, an eight megabyte filter and a smaller one megabyte filter in which eight bits of the larger filter map to one bit of the smaller filter. If memory is constrained in the cluster or the network is overloaded, the smaller one megabyte filters may be transferred to the other nodes, reducing the network traffic to (1 MB×($16^2$−16))=240 MB. Each multilevel filter, including the larger filter, may be used on the node where it was generated to facilitate matching of local table B data with table A data received from other nodes. Alternatively, two or more levels of a multilevel filter may be transferred to other nodes. In one embodiment, filters received from different nodes may be merged to reduce memory use.

With reference now to the figures, an example environment for present invention embodiments is illustrated in FIG. 1. Specifically, the environment includes client or end-user system 100, server system 110, and two or more node systems 120. Client systems, 100 and server system 110, and node systems 120 may be remote from each other and communicate over a network 12.

Network 12 may be implemented by any number of any suitable communications media (e.g., wide area network (WAN), local area network (LAN), Internet, intranet, etc.). Alternatively, any number of server systems 100 and client systems 110 may be local to each other, and communicate via any appropriate local communication medium (e.g., local area network (LAN), hardwire, wireless link, intranet, etc.).

Server system 110 may include a relational database management system (RDBMS) 112 (or other server process or application). The RDBMS may be implemented across plural server systems. Alternatively, RDBMS 112 may reside on a node system 120, client system 100, or other computer system in communication with the node systems. The RDBMS includes a planner/optimizer module 114.

Client systems 110 enable users to communicate with the RDBMS (e.g., via network 12). The client systems may present any graphical user (e.g., GUI, etc.) or other interface (e.g., command line prompts, menu screens, etc.) to receive commands from users, and interact with the RDBMS module and/or other modules or services.

Node systems 120 (or nodes) may be implemented in a shared-nothing architecture, in which separate node systems do not share memory or processor(s) with each other. Each node system may have its own local persistent storage. Database tables 122 and 124 of a database managed by RDBMS 112 are distributed over two or more node systems 120. For example, some or all of the node systems may store a partition of table 122; some or all of the node systems may store a partition of table 124; and some, all, or none of the nodes may store both a partition of table 122 and a partition of table 124. In addition, other tables of the database may be stored over one or more of the node systems. Each node system may include an execution engine (not shown) for performing queries against the database.

Each client system 100, server system 110, and node system 120 may be implemented by any conventional or other computer systems optionally equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., RDBMS module software). For example, an individual client system, server system, or node system may be implemented as a multiprocessor system using a non-uniform memory access (NUMA) memory design The planner/optimizer and execution engines may be implemented by any combination of any quantity of software and/or hardware modules or units, may reside within memory 30 of a server system or node system for execution by processor 20, and may include one or more other modules or units to perform the various functions of present invention embodiments described below. For example, the planner/optimizer may include modules or units for assessing network traffic and available memory capacity of node systems, determining levels of a multi-level filter to be transferred between particular nodes, and the like. An execution engine may include a multilevel filter generation module, multilevel filter probing module, and one or more other modules or units for performing join operations, hashing join keys or other values, generating individual filter levels, probing individual filter levels, dynamically disabling a level of a multilevel filter, and the like.

Initially, generation and application of a multilevel filter are described with respect to FIGS. 2-5. Use of multilevel filters and transfer of selected levels within a distributed parallel processing system are then described with respect to FIG. 6.

Figure 2:
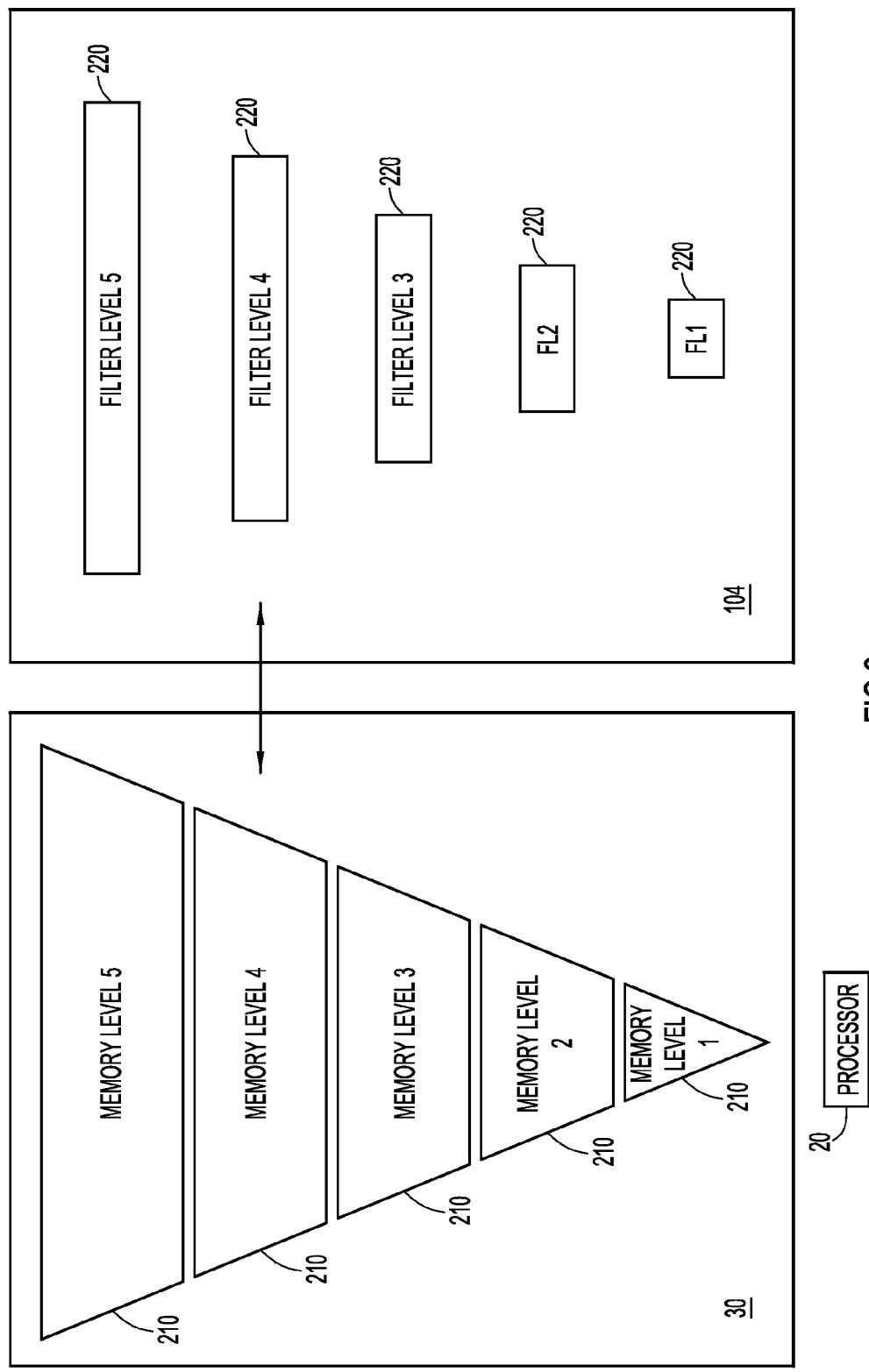
FIG. 2 is a block diagram of an example memory hierarchy of a node system and corresponding multilevel filter according to an embodiment of the present invention.

A block diagram of an example memory hierarchy (e.g., of a node system 120) and a corresponding multilevel filter according to an embodiment of the present invention is illustrated in FIG. 2. Memory 30 may be hierarchically structured and comprise two or more memory levels 210, which may be numbered for description purposes 1, 2, . . . n based on size, where lower numbered layers have lower storage capacity than higher numbered layers. Alternatively, the memories may be numbered based on the time required for a processor 20 to access information in the memory. Typically, processor 20 accesses each lower numbered or smaller memory layers faster than each higher numbered or larger memory layers. For example, memory levels 1, 2, and 3 may be levels of a cache hierarchy, while memory level 4 is a main system random access memory (RAM). In a multiprocessor node system using a non-uniform memory access (NUMA) memory design with three levels of cache per processor core, level 4 may designate local memory and level 5 may designate remote memory. In general, memory 30 may include any combination of two or more levels of any sizes, including any number of cache and/or other memory levels (e.g., one cache level, four cache levels, persistent memory (e.g., magnetic disk, optical disk, magnetic tape, etc.), remote memory (e.g., memory of a system connected via network 12), etc.), and may be labeled in any fashion.

A multilevel filter comprises a plurality of filter layers 220 (each an individual filter) and may have a structure corresponding (at least in part) to the structure of the memory hierarchy. For example, filter layers numbered 1, 2, . . . n may correspond to memory levels 1, 2, . . . n, where, by way of example, higher numbered filter layers are larger than lower numbered filter layers and a filter layer has a size that may fit within the corresponding memory level. The multilevel filter need not have a level corresponding to each level of the memory hierarchy.

Figure 3:
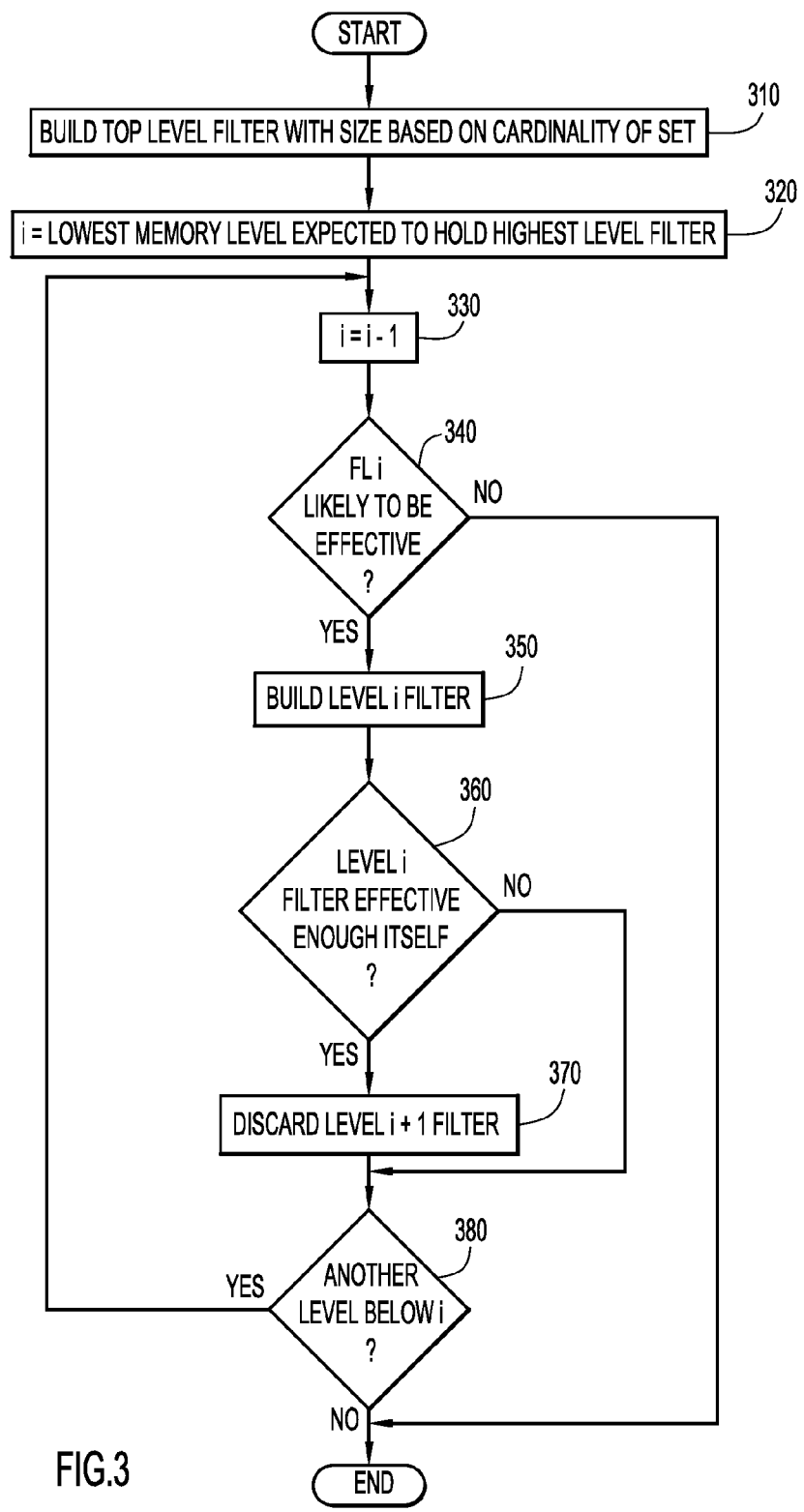
FIG. 3 is a flow diagram illustrating an example manner of building a multilevel filter according to an embodiment of the present invention.

An example manner of building a multilevel filter (e.g., via processor(s) 20 of a node system 120 and a multilevel filter generator module) according to an embodiment of the present invention is illustrated in FIG. 3. Initially, at step 310, the highest level of the filter is built. The size of this level of the filter may be based on the cardinality n of the set for which it will be used to test membership (e.g., the number of distinct join keys in an inner table of join operation). For example, the top level filter may be a Bloom filter with an m-bit bitmap using a predetermined number of hash functions k (e.g., 1, 2, 3, etc), where m is approximately equal or proportional to n $\log_2$ n, subject to the condition that the bitmap fit within highest capacity memory level. Alternatively, m may be a selected value (e.g., set to a predetermined value) and k chosen to optimize the probability of false positive results (e.g., k may be set close to $$\frac{m}{n}\ln 2)$$

In general, the size of the highest filter levgel may be set in any manner, taking into account any factors, subject to the constraint that it fit within available memory.

Parallel processing may be used to build the highest level filter. For example, on a node system 120 implemented as a multi-processor NUMA system, shared memory may be allocated for a global copy of the filter, and the elements of the set may be partitioned among concurrent threads. Each thread fills a local copy of the bitmap (or other structure) by processing a subset of the elements and merges the local copy into the global copy (e.g., using bitwise OR operations to merge bitmaps). Once the global copy is built, the local copies are no longer needed and the memory consumed by them is released. If memory is too constrained (e.g., if the memory local to a processor cannot contain a copy of the entire bitmap), partitioning may be employed so that each thread builds only a part of the bitmap.

At step 320, the lowest memory level that has sufficient storage capacity to contain the highest filter level is determined. The number of this memory level may be assigned to a current level number i. For example, in a system with five levels of memory, the filter built in step 310 may be expected to fit within memory level four, in which case the current level number is i=4. At step 330, the next lowest level is considered. For example, the current level number i may be decremented by one.

At step 340, a pre-build analysis may be performed to determine whether to build a new, smaller filter for the current level. The new filter level may have a size expected to fit or approximately fit within the current memory level i or within available memory of another node system 120. For example, the new filter may use a bitmap of size equal to the capacity of memory level i. The new filter level will not be effective if most of the bits in its bitmask are set because the rate of false positive results will be too high and may be correlated with false positive results from the higher level filter. The pre-build analysis may estimate the number of bits that will be set in the new bitmap based on the size and number of bits set in the higher level filter. This may be done by using a model in which set bits will be uniformly distributed throughout the new bitmap. Alternatively, the pre-build analysis may directly count the number bits that will be set in the new bitmap (e.g., by scanning the higher level bitmap). The analysis may determine the new filter to be ineffective if the fraction of set bits in the new filter will be above a predetermined threshold (e.g., 40%, 60%, 80%, 95%, 99%, etc.). If it is determined that the new filter will not be effective, processing ends and no filter is built at the current or lower levels. Otherwise processing proceeds to step 350.

At step 350, a new, smaller filter is built to fit within the current memory level i. In one embodiment of the present invention, each bit of the new filter corresponds to r consecutive bits of the next highest level filter, where r is the ratio of the two filter sizes. For example, if the current memory level L3 has a capacity of 4 MB, and there is a filter at level four of size 32 MB, then r may be eight. A bit will be set in the new bitmap if any bit in the corresponding r bits of the higher level filter are set.

In a multiprocessor system, the new filter may be built in parallel by partitioning the higher level filter into a number of contiguous-bit segments equal to the number of threads to be used for processing. Each thread may work independently by sequentially reading its portion of the higher level filter and sequentially writing to its corresponding portion of the new filter. Since the threads may read and write without synchronization, the cost of creating the new filter may be rendered negligible in this manner.

Alternatively, a new filter may be built using different hash functions (or different hash bits of the same hash function) than used for the other filter levels. For example, a new smaller filter may be built in the same manner as the top level filter except that a new hash function is applied to the elements of the set to generate hash values used as addresses for the smaller filter, or a new smaller filter may be built in the same manner as the top level filter where low bits of the hash values are used as addresses for the top level filter and high bits of the hash values are used as addresses for the smaller filter. In this case, contiguous bits of the higher level filter will generally not correspond to the same bit in the smaller table. This may improve the effectiveness of the multilevel filter as a whole, however the improvement in effectiveness may come at the cost of increased build time due to additional hashing requirements and random writes.

To probe a multilevel filter in which different hash functions are used for different layers, the hash function(s) for each of the filter levels may be applied in turn to the item being tested if a lower level of the filter has not indicated that the item is absent from the set.

At step 360, a post-build analysis determines whether the new, smaller filter at the current level is effective enough that the higher level filter may be discarded. For example, if the filter at the current level i costs p to probe and is expected to pass a fraction f of the elements (e.g., keys of an outer join table) tested against it, and a filter at level i+1 costs q to probe and is expected to pass a fraction g of the elements given the presence of the filter at level i, and the cost of processing an element that passes the filter at level i+1 is h, then the cost of using both the filter at level i and the filter at level i+1 is (p+fq+gh). Using the level i filter alone costs (p+fh). The costs (e.g., accesses times) and passing fractions may be estimated using standard techniques. If the cost of using the level i filter alone is expected to be less than the cost of using the level i filter and the higher level filter (e.g., level i+1 filter) together, then the higher level filter is discarded at step 370.

At step 380, processing ends if the there is no memory level below the current level. Otherwise, processing returns to step 330 and continues for the next lower level.

Figure 4:
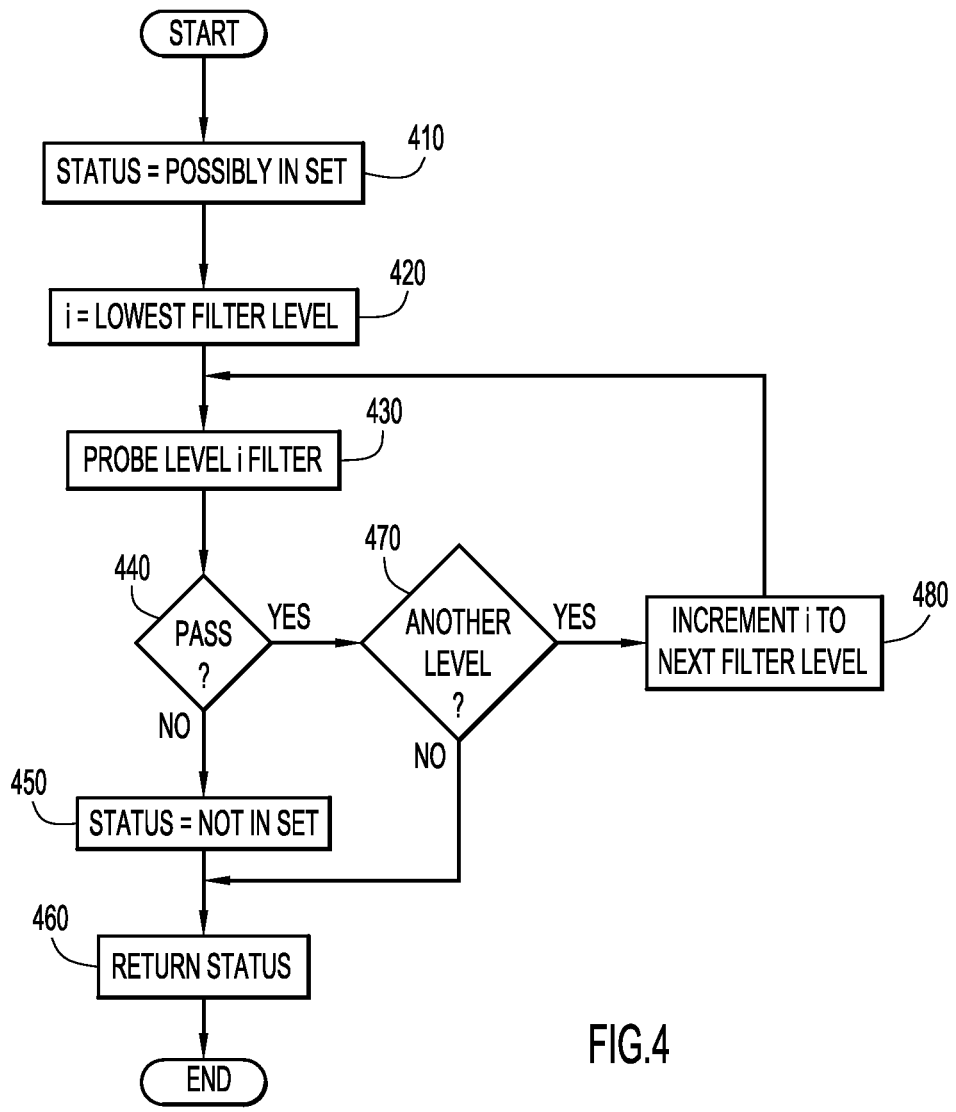
FIG. 4 is a flow diagram illustrating an example manner of probing a multilevel filter according to an embodiment of the present invention.

An example manner of using a multilevel filter to test whether an element is a member of a set (e.g., via processor(s) 20 and multilevel filter probing module) according to an embodiment of the present invention is illustrated in FIG. 4. In particular, at step 410 a status flag is provisionally set to indicate that the element is possibly in the set. At step 420, a current filter level i is initialized to the lowest filter level. At step 430, the filter for level i is probed to test whether the element is a member of the set. For example, if the filter for level has the form of a bitmap built using a single hash function to set (to one) bits corresponding to elements in the set, the hash function is applied to the element, and the bit at the location indicated by the hash value is examined; a bit value of one indicates a positive result and a bit value of zero indicates a negative result.

If the result is negative as determined at step 440, the status flag is set to indicate that the element is not in the set at step 450, and the status flag is returned at step 460. If the result of the test at step 440 is positive, then it is determined at step 470 whether the current filter level is the highest filter level. If not, then the current filter level is incremented upward to the next filter level at step 480 and processing returns to step 430. For example, if the current filter level is i=2 and there is a filter for level three, i is set to three; if there is a filter for level four but not for level three, i is set to four; etc. If the current filter level is the highest filter level at step 470, processing proceeds to step 460, and the status flag (indicating that the element is possibly in the set) is returned.

In other words, the levels of a multilevel filter are probed in the reverse of the order in which they were built (e.g., smallest storage capacity to largest storage capacity, or fastest access time to slowest access time). For example, with respect to join-filters, the filter at level one may be probed first, and if the result is negative, a tuple from an outer join table may be discarded immediately as a non-matching row. On the other hand, if a match is found at this level, the filter at level two is probed. As long as the lower levels of the join-filter hierarchy provide sufficiently efficient filtering, the cost of probing the multilevel join-filter will be reduced. By way of illustration, an embodiment using a two-level join-filter reduces the total time spent probing the join-filter by 25% compared to a single level join-filter for an industry standard benchmark workload, and 50% for an actual user workload.

In a multilevel filter, a lower level filter may prove to be ineffective because it is too small. On the other hand, a higher level filter may turn out to be ineffective if the lower levels have already done a good job of providing most of the filtering (e.g., allowing non-matching tunics from an outer join table to be discarded in a join operation). To minimize the cost of probing ineffective filters at any level, the effectiveness of each filter level may be measured at runtime by sampling its passing rate. If the filter at a given level turns out to be ineffective, then that filter level may be temporarily disabled.

Figure 5:
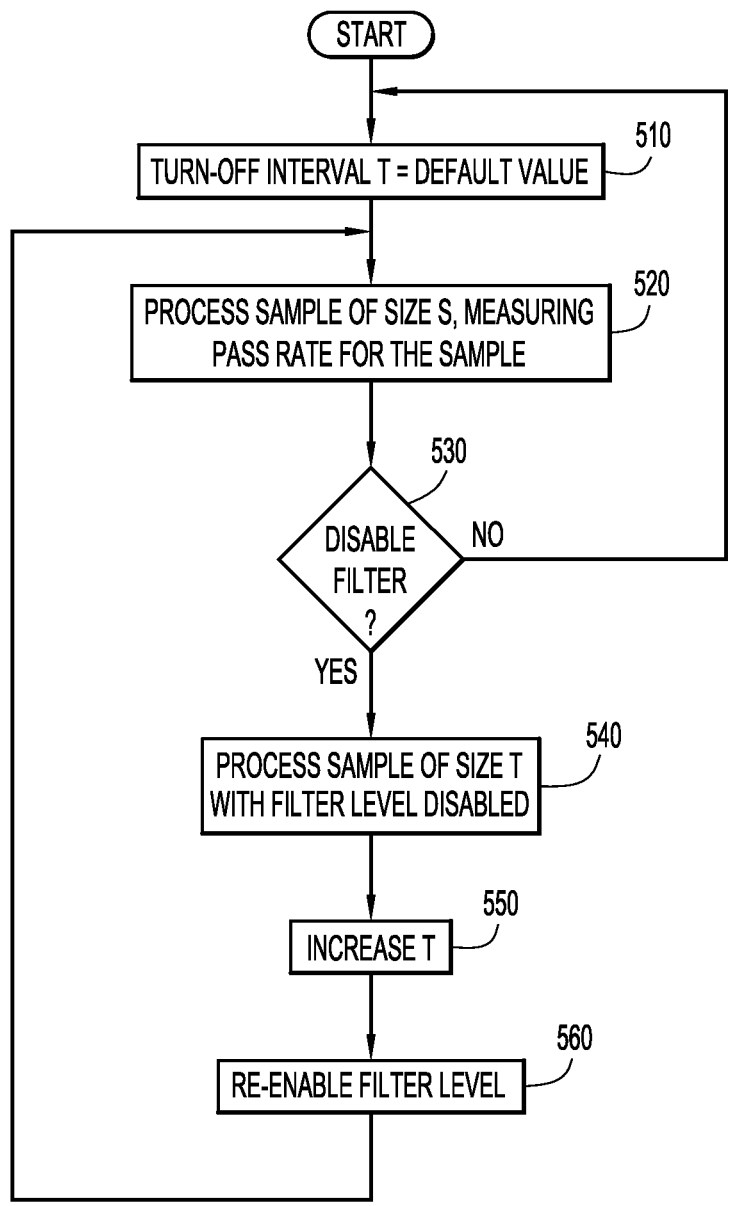
FIG. 5 is a flow diagram illustrating an example manner of dynamically disabling probes of an ineffective filter level according to an embodiment of the present invention.

An example manner of dynamically disabling use of an ineffective filter level (e.g., via processor(s) 20 and multilevel filter probing module of a node system 120) according to an embodiment of the present invention is illustrated in FIG. 5. At step 510 a turn-off interval is initialized to a default number of tests (e.g., 1K, 10K, 2.56K, etc.) against the filter for a given level. At step 520, a sample of S elements (e.g., 1K, 10K, 256K, etc.) are tested against the filter for the level, and the pass rate for the sample is measured. The pass rate for the sample may be measured by counting the number of elements of the sample for which the filter level indicates that the element may be a member of the set, and dividing this count by the sample size S.

At step 530, the measured pass rate is evaluated (e.g., by comparing the pass rate to a predetermined threshold) to determine whether the filter level should be disabled. If it is determined that the filter level should be disabled, a subsequent sample of size T is processed against the multilevel filter with the filter level disabled at step 540. At step 550, the turn-off interval T is increased. For example, the turn-off interval may be doubled, increased by a constant amount, or the like. The filter level is re-enabled at step 560 and processing returns to step 520. If it is determined at step 530 that the filter level should not be disabled, processing returns to step 510, and the turnoff interval is reset to the default value.

By way of example, a node may process 256K rows of a billion row outer table in a join operation and determine that the filter for a particular level is ineffective. The node may turn off the filter for that level for the next 256K rows, after which the filter for that level is re-enabled. For example, the turn-off interval may be doubled each time a sample is processed with the filter and find the filter is found to be ineffective. The turn-off interval may be reset to the default value when the filter is found to be effective. Re-enabling the join-filter is useful when the probe keys are clustered according to the layout in the table, as often happens with date or time based keys.

Use of a multilevel filter may itself improve the speed of a join operation. For example, in performing the join operation, a node may build a hash table of rows in the inner table by hashing the key value on which the inner and outer tables are to be joined. In addition, the node may build a multilevel filter for testing whether a key appears in the inner table. The node may then loop over rows of the outer table, and for each row in the outer table, test the key value of that row against the multilevel filter. The result of the test will indicate either that the key value does not exist in the inner table, or that that the key value possibly exists in the inner table. The former result indicates that the current outer table row will not appear in the query results, and the node may proceed to the next outer table row. In the case of the latter result, the node may probe the hash table to determine which, if any, inner table rows match the current outer table row based on the join key. If, for example, one level of the multilevel filter resides in a memory cache and another resides in local memory, the cost of accessing the hash table in remote memory—and even the cost of accessing local memory—may be avoided when the multilevel filter returns a negative result.

Figure 6:
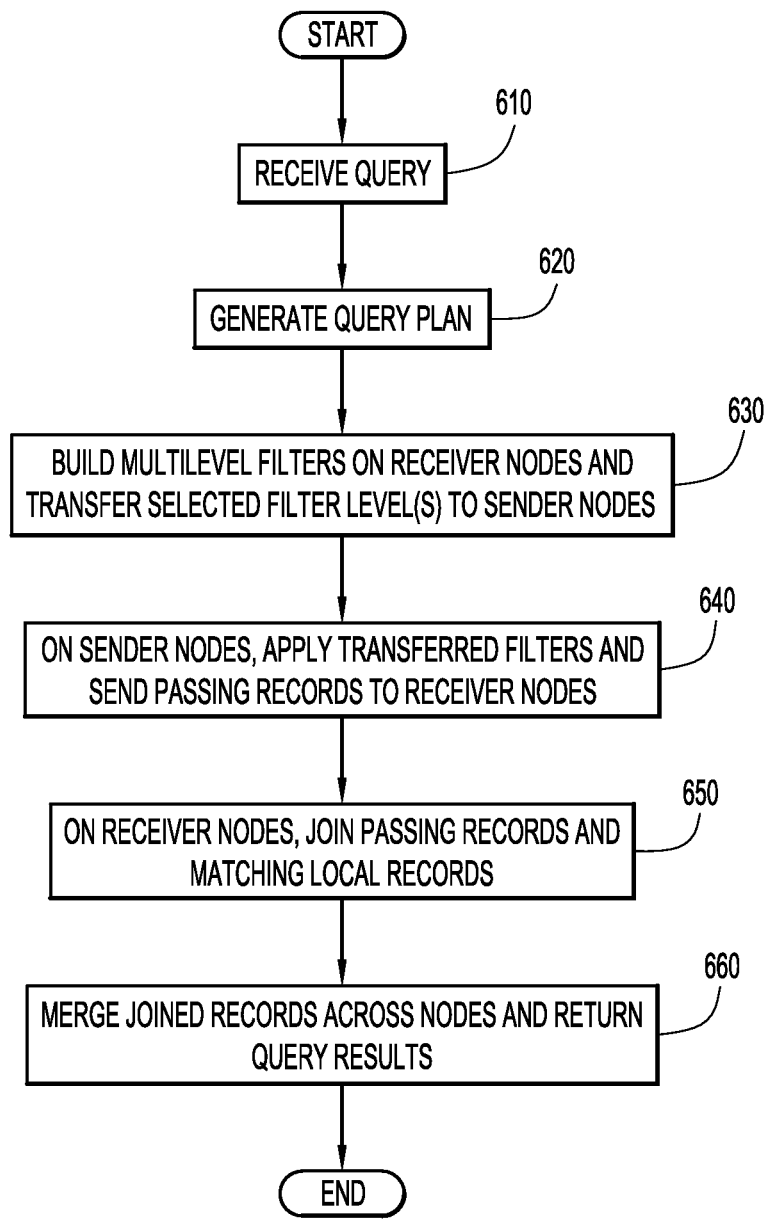
FIG. 6 is a flow diagram illustrating an example manner of utilizing multilevel filters within a distributed parallel processing system according to an embodiment of the present invention.

An example manner of utilizing multilevel filters within a distributed parallel processing database system according to an embodiment of the present invention is illustrated in FIG. 6. Initially, RDMS 112 receives a query including at least one join operation at step 610. For example, the query may have the form: SELECT x,y FROM A,B where A.z=B.z. The query may include more than one join operation.

At step 620, planner/optimizer 114 generates a plan for executing the query. The planner/optimizer chooses a table from which data is be sent over the network to nodes on which partitions of the other table are stored. Nodes that have data of the chosen table are referred to as sender nodes. Nodes which may have data to be joined with data of the chosen table are referred to as receiver nodes. By way of example, consider that the planner/optimizer determines that data from table A will be sent to nodes that have partitions of table B; thus, nodes containing partitions of table A are sender nodes, and nodes containing partitions of table B are receiver nodes. Since the query plan may call for receiver nodes (receivers of table data) to build and transfer filters to sender nodes (senders of table data), receiver nodes may also be referred to "source nodes" (sources of filters), and sender nodes may also be referred to as "destination nodes" (destinations for filters).

The query plan indicates the manner in which join-filters will be generated and used by receiver and sender nodes. The planner/optimizer may determine that each (or selected ones) of the receiver nodes is to build a multilevel filter indicating join keys (e.g., B.z values) absent from the table B partition stored on that node. The planner/optimizer may determine the number and sizes of levels of each multilevel filter to be built on a receiver node based on the sizes of memory levels on that receiver node, available capacities of memories on one or more sender nodes, the number of receiver nodes, and the like. For example, a three-level filter may be built, where the largest level is sized to fit within the main RAM of the receiver node, the smallest level is sized to fit within the L3 cache of the receiver node, and the middle level is sized such that middle levels from each receiver node may be kept together within the main RAM of a sender node.

The planner/optimizer may determine that some, all, or none of the levels of a filter are to be transferred to sender nodes based on network traffic and/or available memory of the sender nodes. For example, if the sender nodes have sufficient available memory to contain entire multilevel filters for each receiver node, the planner/optimizer may select the largest sized filter level to be transferred to the sender nodes. The sender nodes may locally generate smaller size levels of a multilevel filter from the transferred level.

Alternatively, if the sender nodes do not have sufficient available memory to contain the largest filter levels from each receiver node, the planner/optimizer may select a smaller sized filter level to be transferred to the sender nodes. The sender nodes may locally generate still smaller sized filter levels from the transferred level if smaller sized levels are likely to be effective.

In one embodiment, the planner/optimizer may select more than one filter level to be transferred to sender nodes, and the largest selected level from each receiver node may be merged. For example, each receiver node may build a multilevel filter having an eight megabyte layer and a one megabyte layer. Each sender node will receive a one megabyte filter from each receiver node and keep the one megabyte filters separate. The eight megabyte filters from each receiver node will be merged, and each sender node will maintain a single, merged eight megabyte filter. The merged filter may operate as a higher level of a multidimensional filter for each of the one megabyte filters.

The planner/optimizer may customize on a node-by-node basis which level or levels of each multilevel filter are to be built and to which sender nodes those levels are to be delivered. In making these determinations, the planner/optimizer may acquire run-time measurements of network and/or node memory usage using conventional or other methods. For example, if some of the sender nodes, but not others, are subject to a concurrent workload that limits the amount of memory available on those nodes for the join operation, the burdened nodes may be delivered smaller filters than the other sender nodes.

At step 630, the multilevel filters are built on receiver nodes and selected levels from the multilevel filters are transferred to sender nodes. If merging of large filters will occur, the filters may be transferred in a manner to reduce network traffic. In particular, if filters from all nodes will be merged, the nodes may be grouped into pairs. Each pair node merges their large filters. Then pairs of pairs merge their filters, and so on. As a result, the amount of data transferred over the network is $O(n \log n)$, rather than $O(n^2-n)$, where n is the number of nodes.

Alternatively, the receiver nodes may be ordered in a sequence. The first receiver node transfers its large filter to the second. Upon receiving a filter from the previous receiver node, each one merges the received filter with its own and transfers the result to the next until the last receiver node in the sequence is reached. The last receiver node transfers the resulting merged filter to each of the sender nodes.

Levels generated solely for transfer to sender nodes, rather than to fit within a local memory level, may be deleted after the transfers are complete.

At step 640, sender nodes apply the filters transferred to them from the receiver nodes and send passing records to receiver nodes. Sender nodes may locally generate still smaller sized filter levels from the transferred levels if smaller sized levels are likely to be effective. For each receiver node and each sender node, the sender node tests each join key from local table A data against the filter transferred from the receiver node (or against a multilevel filter derived from that filter) and, if necessary, against a larger merged filter. If the results of the test indicate that a matching table B record possibly exists on the receiver node, the sender node sends each table A record (e.g., (A.x, A.z) tuples) containing that key to the receiver node. Alternatively, the sender node may send only the join key values (e.g., A.z) and await confirmation that the rows will qualify for the join before sending the remaining columns.

At step 650, the receiver nodes join the records sent by the sender nodes against matching local records. To identify matching records, a receiver node may test records received from sender nodes against the most effective multilevel or individual filter generated at step 630 prior to probing a local hash table. For example, the receiver node may join received data (e.g., table A data) with local data (e.g., table B data) using the multilevel filter generated at step 530 to improve the speed of the join operation in the manner described above with the received data treated as the outer table and the local data treated as the inner table.

Alternatively, receiver nodes may join received data (e.g., table A data) with local data (e.g., table B data) by treating the received data as the inner table and the local data as the outer table. In this scenario, receiver nodes may discard any filters generated at step 630 after transferring them to the sender nodes, and the receiver nodes may build a new hash table and filter for the received data to facilitate the join.

At step 660, the joined records formed by each receiver node may be merged. For example, each receiver node may send its joined records to server system 110, which may perform the merge and return query results to client system 100. Alternatively, the receiver nodes may retain the joined records (and/or transfer them other nodes) for further processing (e.g., a join with another table) before final query results are returned.

It will be appreciated that the embodiments described above and illustrated in the drawings represent only a few of the many ways of implementing embodiments for distributing filters in a distributed database system.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, multilevel filter generation module, multilevel filter generation module, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for testing set membership using multilevel filters in any application program or service.

A level of a multilevel filter may have any size at least partially accommodated within the corresponding memory level. For example, a filter level size may be less than or equal to the capacity of the corresponding memory level. A filter level size may be greater than the corresponding level capacity if supported by the memory hierarchy. For example, a filter level for a memory cache may exceed the cache size (by, e.g., 1%, 5%, 10%, etc. of the cache size) at the cost of a corresponding decrease in cache hit efficiency.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions Which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for transferring filters for operations in a distributed system including a plurality of source nodes and destination nodes coupled to a network, the system comprising:
at least one processor configured to:
generate at each source node a first filter of a first size, wherein the first filter includes a bitmap and indicates elements of objects of a data set that are not processed for an operation;
generate at each source node one or more second filters each including a bitmap, wherein each generated second filter is based on a prior generated filter comprising one of the first filter and a prior second filter, wherein each bit in the bitmap of the generated second filter representing a logical combination of bits from a plurality of consecutive locations within the bitmap of the prior generated filter, and wherein the first filter and one or more second filters form a multilevel filter with each of the one or more second filters having a second size smaller than a size of the prior generated filter and representing a same data set as the data set of the first filter to indicate the elements of the objects of the data set of the first filter to remove for the operation independent of other filters of the multilevel filter;
determine a filter size less than the first size for the one or more second filters based on an amount of traffic on the network;
transfer a second filter from among the one or more second filters of the multilevel filter having the second size satisfying the filter size from each of the source nodes to each of the destination nodes; and
determine the elements of the objects to remove for the operation based on the transferred second filters.

2. The system of claim 1, wherein determining the elements of the objects to remove includes:
determining the elements of the objects to remove from the operation at one or more nodes based on a corresponding first filter and the transferred second filters.

3. The system of claim 1, wherein the plurality of source nodes and the plurality of destination nodes have at least one node in common.

4. The system of claim 1, wherein a plurality of the second filters are generated, and the at least one processor is further configured to:
transfer the first filter and remaining second filters from each of the source nodes to each of the destination nodes in the distributed system, and wherein determining the elements of the objects to remove includes:
merging the transferred first filter and remaining second filters into a merged filter; and
determining the elements of the objects to remove for the operation based on the transferred second filter and the merged filter.

5. The system of claim 4, wherein merging the transferred first filter and remaining second filters further includes:
combining the first filter and remaining second filters by groups of nodes to generate respective combined filters; and
successively merging the combined filters generated by one or more successive groups of nodes to produce the merged filter.

6. The system of claim 5, wherein merging the transferred first filter and remaining second filters further includes:
combining the first filter and remaining second filters at a source node to produce a combined filter;
transferring the combined filter to successive nodes to combine with the first filter and remaining second filters of the successive nodes to produce the merged filter; and
transferring the merged filter to the nodes of the distributed system.

7. A computer program product for transferring filters for operations in a distributed system including a plurality of source nodes and destination nodes coupled to a network, the computer program product comprising:
a computer readable storage medium having computer readable program code embodied therewith for execution on a processing system, the computer readable program code comprising computer readable program code configured to:
generate at each source node a first filter of a first size, wherein the first filter includes a bitmap and indicates elements of objects of a data set that are not processed for an operation;
generate at each source node one or more second filters each including a bitmap, wherein each generated second filter is based on a prior generated filter comprising one of the first filter and a prior second filter, wherein each bit in the bitmap of the generated second filter representing a logical combination of bits from a plurality of consecutive locations within the bitmap of the prior generated filter, and wherein the first filter and one or more second filters form a multilevel filter with each of the one or more second filters having a second size smaller than a size of the prior generated filter and representing a same data set as the data set of the first filter to indicate the elements of the objects of the data set of the first filter to remove for the operation independent of other filters of the multilevel filter;
determine a filter size less than the first size for the one or more second filters based on an amount of traffic on the network;
transfer a second filter from among the one or more second filters of the multilevel filter having the second size satisfying the filter size from each of the source nodes to each of the destination nodes; and
determine the elements of the objects to remove for the operation based on the transferred second filters.

8. The computer program product of claim 7, wherein determining the elements of the objects to remove includes:
determining the elements of the objects to remove from the operation at one or more nodes based on a corresponding first filter and the transferred second filters.

9. The computer program product of claim 7, wherein the plurality of source nodes and the plurality of destination nodes have at least one node in common.

10. The computer program product of claim 7, wherein a plurality of the second filters are generated, and the computer readable program code further comprises computer readable program code configured to:

transfer the first filter and remaining second filters from each of the source nodes to each of the destination nodes in the distributed system, and wherein determining the elements of the objects to remove includes:
- merging the transferred first filter and remaining second filters into a merged filter; and
- determining the elements of the objects to remove for the operation based on the transferred second filter and the merged filter.

11. The computer program product of claim 10, wherein merging the transferred first filter and remaining second filters further includes:
- combining the first filter and remaining second filters by groups of nodes to generate respective combined filters; and
- successively merging the combined filters generated by one or more successive groups of nodes to produce the merged filter.

12. The computer program product of claim 11, wherein merging the transferred first filter and remaining second filters further includes:
- combining the first filter and remaining second filters at a source node to produce a combined filter;
- transferring the combined filter to successive nodes to combine with the first filter and remaining second filters of the successive nodes to produce the merged filter; and
- transferring the merged filter to the nodes of the distributed system.

13. The system of claim 1, wherein the distributed system includes a database system, and the operation includes a join operation.

14. The system of claim 1, wherein a plurality of the second filters are generated, and transferring a second filter includes:
- determining memory constraints in the distributed system; and
- transferring at least one of the second filter and a group of filters from each of the nodes to each of the other nodes in the distributed system based on the traffic on the network and the determined memory constraints, wherein the group of filters includes the first filter, the second filter, and remaining second filters;

wherein determining the elements of the objects to remove includes:
- determining the elements of the objects to remove for the operation based on the at least one transferred second filter and the group of filters.

15. The computer program product of claim 7, wherein the distributed system includes a database system, and the operation includes a join operation.

16. The computer program product of claim 7, wherein a plurality of the second filters are generated, and transferring a second filter includes:
- determining memory constraints in the distributed system; and
- transferring at least one of the second filter and a group of filters from each of the nodes to each of the other nodes in the distributed system based on the traffic on the network and the determined memory constraints, wherein the group of filters includes the first filter, the second filter, and remaining second filters;

wherein determining the elements of the objects to remove includes:
- determining the elements of the objects to remove for the operation based on the at least one transferred second filter and the group of filters.

17. The system of claim 1, wherein each bit in the bitmap of the generated second filter represents bits from a plurality of locations associated with at least two different hash values from the bitmap of the prior generated filter.

18. The computer program product of claim 7, wherein each bit in the bitmap of the generated second filter represents bits from a plurality of locations associated with at least two different hash values from the bitmap of the prior generated filter.

* * * * *